United States Patent [19]
Cohen

[11] Patent Number: 4,736,285
[45] Date of Patent: Apr. 5, 1988

[54] DEMAGNETIZATION CIRCUIT FOR FORWARD CONVERTER

[75] Inventor: Itzchak Cohen, Dix Hills, N.Y.

[73] Assignee: Veeco Instruments, Inc., Melville, N.Y.

[21] Appl. No.: 876,215

[22] Filed: Jun. 19, 1986

[51] Int. Cl.[4] .............................................. H02M 3/335
[52] U.S. Cl. ............................................ 363/20; 363/56
[58] Field of Search ............................... 363/20, 21, 56

[56] References Cited

U.S. PATENT DOCUMENTS

| | | | |
|---|---|---|---|
| 4,224,659 | 9/1980 | Iguchi | 363/20 |
| 4,328,538 | 5/1982 | Pollmeier | 363/56 |
| 4,378,586 | 3/1983 | Bete | 363/19 |
| 4,415,959 | 11/1983 | Vinciarelli | 363/21 |
| 4,441,146 | 4/1984 | Vinciarelli | 363/20 |
| 4,541,039 | 9/1985 | Sandler | 363/21 |
| 4,559,590 | 12/1985 | Davidson | 363/21 |
| 4,561,046 | 12/1985 | Kuster | 363/56 |
| 4,562,523 | 12/1985 | Rodel et al. | 363/56 |

Primary Examiner—Patrick R. Salce
Assistant Examiner—Jeffrey Sterrett
Attorney, Agent, or Firm—Morgan & Finnegan

[57] ABSTRACT

A demagnetization circuit for use with a forward converter includes a drive winding magnetically coupled to the primary winding of the forward converter, a capacitor for absorbing leakage and magnetization energies from the primary winding when the forward converter is switched off, an inductor for absorbing energy from the capacitor, and a switching circuit for selectively connecting the inductor to the input voltage source of the forward converter.

23 Claims, 1 Drawing Sheet

DEMAGNETIZATION CIRCUIT FOR FORWARD CONVERTER

BACKGROUND OF THE INVENTION

1. Field of the Invention

This invention relates to DC-to-DC converters that process electrical power from a source, and more particularly, to a variable voltage demagnetization circuit for use with a DC-to-DC forward converter.

2. Description of the Prior Art

In a DC-to-DC forward converter, a power transformer is simultaneously connected to a source and a load. The transformer of the forward converter must completely demagnetize so that the transformer will not become saturated, and hence, inoperable. That is, $V_s \times t_{on} = V_{dem} \times t_{off}$ were $V_s$ is the source to the transformer during the time $t_{on}$ and $V_{dem}$ is the demagnetizing voltage applied during the time $t_{off}$. The products $V_s \times t_{on}$ and $V_{dem} \times t_{off}$ represent, respectively, the energy stored in the transformer, and the energy released therefrom.

Conventional demagnetization topologies embodied in circuits provide demagnetization voltages that are either directly proportional to the input voltage, or are fixed. In either case, a demagnetization voltage higher than the theoretically necessary minimum voltage is generated, and necessarily imposes a high rating requirement for the switching transistor. The rating of the switching transistor is considerably higher than would be the case if for example the demagnetization voltage could be controlled to be were inversely proportional to the input voltage.

A low rating for a switching transistor in a forward converter is desirable because, in some instances, transistors are unavailable in the desired range. In certain applications, such as in military specifications, a high margin of reliability is required. In order to meet these requirements, a lower rating transistor must be used.

Another problem characterizing forward converters results from the leakage inductance between the windings of the transformer. The sudden interruption of the current in the primary-to-secondary leakage inductance, which occurs when the switching transistor in the forward converter turns off, creates an overvoltage condition across the switching transistor. This overvoltage can be damaging to the transistor and can be effectively clamped only with a complex circuit. Naturally, this overvoltage is undesirable.

OBJECTS AND SUMMARY OF THE INVENTION

It is accordingly an object of the present invention to provide a demagnetization circuit for a forward converter that overcomes the aforesaid defects of the prior art.

It is another object of the present invention to provide a variable voltage demagnetization circuit for a forward converter.

It is yet another object of the present invention to provide a demagnetization circuit for a forward converter that permits a switching transistor with a low voltage rating to be used in the forward converter.

It is still another object of the present invention to provide a demagnetization circuit for a forward converter that permits the advantageous use of a high turns ratio for the transformer of the forward converter.

It is an additional object of the present invention to provide a demagnetization circuit for a forward converter that effectively deals with overvoltages generated by the leakage inductance of the transformer in the forward converter.

It is another object of the present invention to provide a demagnetization circuit for a forward converter that reduces the peak-to-peak ripple current in a filter choke.

It is yet another object of the present invention to provide a demagnetization circuit for a forward converter that reduces transistor current.

It is a further object of the present invention to provide a demagnetization circuit for a forward converter that increases the input voltage range of the converter.

It is still another object of the present invention to provide a demagnetization circuit for a forward converter that will operate from 265 volt AC using a single transistor rated at only 500 V.

In accord with the present invention, a demagnetization circuit for use with a forward converter having a transformer with a primary winding, and an input voltage source, includes capacitance means for absorbing magnetizing and leakage energies from the primary winding of the forward converter, an inductance means for absorbing energy from the capacitance means, and switching means responsive to a switching signal for selectively connecting the inductance means to the input voltage source to return the energy stored therein. This in effect controls the demagnetization voltage to be inversely related to the source voltage, thus permitting lower ratings for the switching transistor.

The above, and other objects, features and advantages of the present invention will be apparent from the following detailed description taken in conjunction with the accompanying drawings.

DETAILED DESCRIPTION OF THE PREFERRED EMBODIMENT

Figure 1:
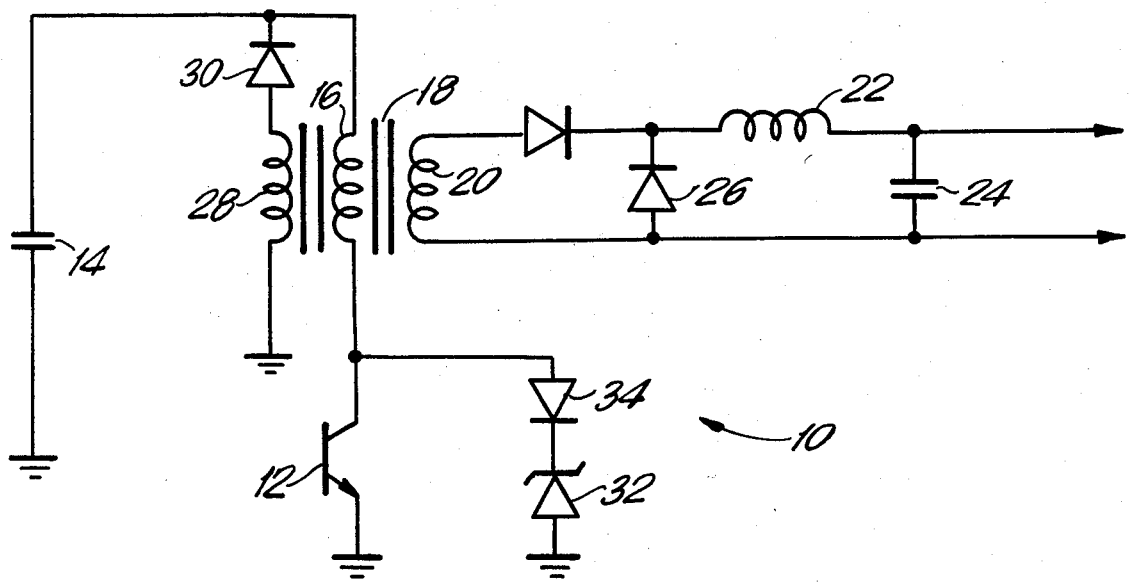
FIG. 1 is a schematic circuit diagram of a prior art forward converter.

Referring to the drawings, and initially to FIG. 1 thereof, a prior art forward converter circuit 10 includes a transistor 12 that alternately turns on and off to convert DC of one voltage to DC of a second voltage. During the "on" period, the voltage of a source 14 is applied to the primary winding 16 of a transformer 18, and a load current flows out of a secondary winding 20 of transformer 18 into a filter comprising an inductor 22 and a capacitor 24, and then into a load resistor (not shown). At the same time, the voltage impressed on primary winding 16 of transformer 18 causes a buildup of a magnetizing current $I_m$ in that winding 16.

When transistor 12 turns off, current through primary winding 16 is interrupted. The load current stops flowing out of secondary winding 20 and is diverted through a diode 26, known as a "flywheel diode." The magnetizing current, unable to flow through primary winding 16, is transferred to a demagnetization winding 28, and the magnetizing energy stored in the core thereof is returned to the voltage source 14 via a diode 30.

The current $I_{28}$ from demagnetization winding 28 will be zero when the demagnetization of the core is completed, i.e., when the volt-second product impressed on demagnetization winding 28 is equal to the volt-second product impressed on primary winding 16 during the conduction time of transistor 12.

From the above, transistor 12 must be turned off a minimum time $t_{off}$ in order to assure complete demagnetization of transformer 18 Replacing $V_s$ and $V_{dem}$ with the turns ratio yields:

$$t_{off} = t_{on} \frac{N_{16}}{N_{16}} \qquad (A)$$

where $t_{on}$ is the conduction time of transistor 12, $N_{28}$ is the number of turns of demagnetization winding 28, and $N_{16}$ is the number of turns of primary winding 16.

For prior art forward converter 10 operating over an input voltage range of $V_{s\ min}$ to $V_{s\ max}$, and having an equal number of turns in primary winding 16 and demagnetization winding 28, ($N_{16}=N_{28}$) the maximum allowable duty cycle $\delta$ of transistor 12 is:

$$\delta_{max} = \frac{t_{on\ max}}{t_{on\ max} + t_{off\ min}} = 0.5 \qquad (B)$$

The maximum voltage seen by transistor 12 is:

$$VQ1_{max} = V_{s max} + V_{s max}\frac{N_{16}}{N_{28}} = 2V_{s max} \qquad (C)$$

Note that the back voltage $VQ1_{max}$ is in this case twice the source voltage.

The output voltage of the forward converter is given by:

$$V_o = V_s N_{20}/N_{16} \qquad (D)$$

Inspection of equation (D) indicates that increasing $\delta$ max above 0.5 can provide two desirable effects:

(a) the converter can maintain regulation at lower source voltages Vs;

(b) The terms ratio $N_{20}/N_{16}$ can be decreased, resulting in a lower current being reflected from the secondary of the switching transistor.

Increasing the duty cycle has a drawback, however. If the maximum duty cycle $\delta$ max is increased above 0.5, the terms ratio $N_{16}/N_{28}$ must also be increased. As a result, the voltage appearing across the switching transistor during the demagnetization time increases, forcing the selection of a higher voltage device.

The prior art circuit of FIG. 1 suffers from significant drawbacks, however. The advantage obtained by the above increase in the duty cycle of transistor 16 is offset by the increase in the required voltage rating of transistor 12.

A second drawback to the circuit of FIG. 1 lies in the existence of leakage inductance between the windings. Any transformer used in forward converter 10 will exhibit a certain amount of leakage inductance between the various windings. At the instant transistor 12 turns off, the sudden interruption of the current in the primary-to-secondary leakage inductance will create an overvoltage condition across transistor 12. This voltage cannot be clamped to the theoretical value predicted by equation (C) due to the leakage inductance existing between primary winding 16 and demagnetization winding 28, thus requiring a clamping circuit, such as a Zener diode 32 and a diode 34 to be connected across transistor 12. The clamping circuit adds unwanted elements to the forward converter 10.

The Preferred Embodiment

Figure 2:
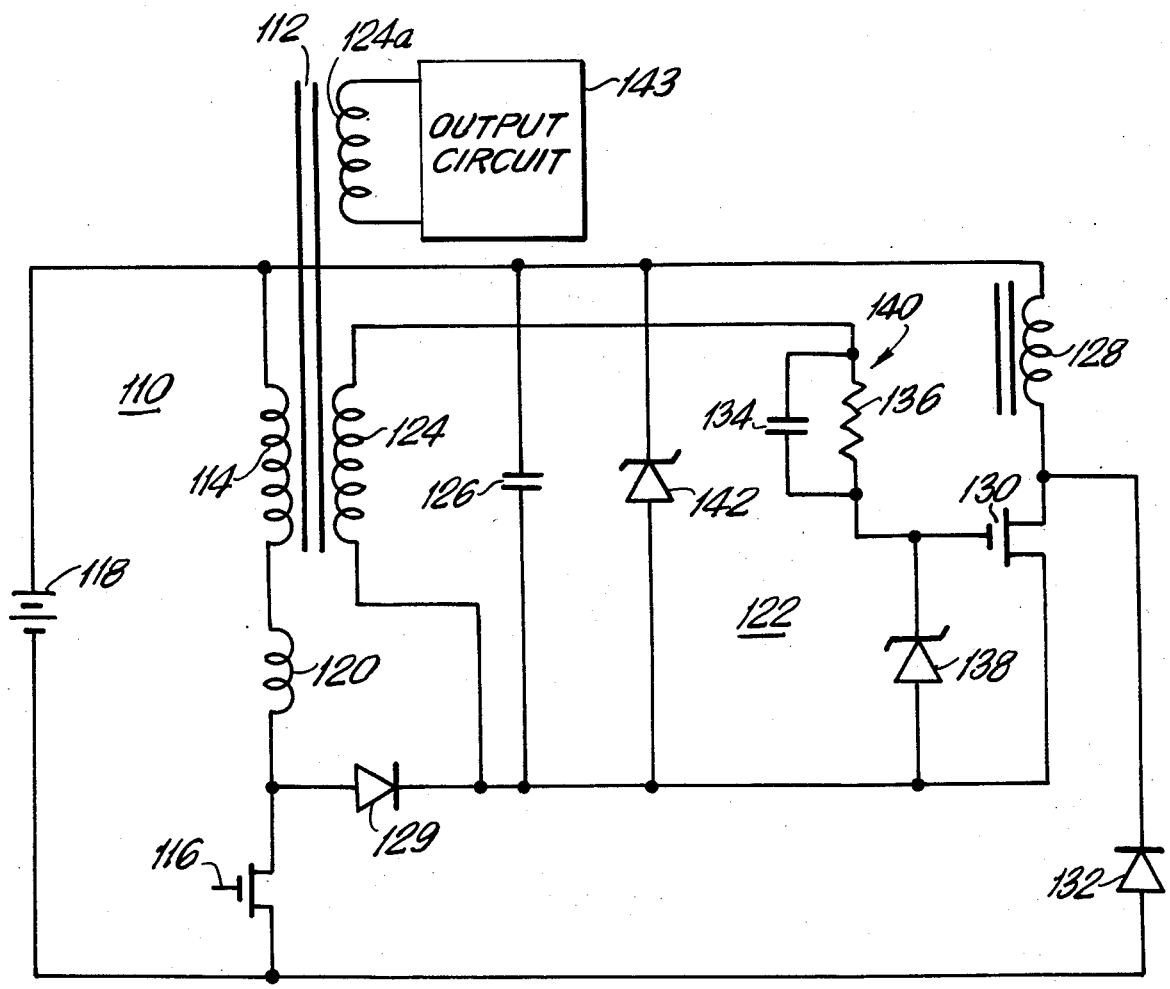
FIG. 2 is a schematic circuit diagram of an embodiment of a variable voltage demagnetization circuit in accord with the present invention and used with a forward converter.

Referring now to FIG. 2, a forward converter 110 is shown which includes a transformer 112 having a primary winding 114 coupled to a switching transistor 116. In the illustrated circuit, transistor 116 is an n-channel FET, although other switches 116 will be suggested to those of ordinary skill in the art.

A voltage source 118 is connected to forward converter 110 and provides the input power thereto. An inductor 120 symbolizes the leakage inductance of transformer 112. (The remaining elements of the forward converter 110 are omitted from FIG. 2 for ease of understanding. However, output winding 124A and output circuit 143 are shown.

A variable voltage demagnetization circuit 122 in accord with an embodiment of the present invention is coupled to forward converter 110 of FIG. 2. Demagnetization circuit 122 includes a drive winding 124 magnetically coupled to primary winding 114 of transformer 112. A capacitor 126 is connected to primary winding 114 of transformer 112 via diode 129. Diode 129 connects 1 side of capacitor 126 to primary winding 114 of transformer 112, and prevents current from flowing from capacitor 126 back to the primary winding 114. The other side of capacitor 126 is connected to the plus terminal of voltage source 118.

Demagnetization circuit 122 includes capacitor 126, an inductor 128 connected to capacitor 126, a switch 130 and a diode 132. Switch 130 is illustrated as a switching transistor such as an n-channel field effect transistor (FET). The gate of switching transistor 130 is connected to demagnetization winding 124 of transformer 112. Diode 132 is connected to inductor 128 and permits the counterclockwise flow of current from inductor 128 to voltage source 118 of forward converter 110, as will be discussed more fully hereinbelow. A capacitor 134, a resistor 136 and a zener diode 138 form a pulse shaping network 140 for the gate of switching transistor 130. Pulse shaping network 140 insures that the gate voltage of transistor 130 has the proper value for any level of signal supplied from demagnetization winding 124. A clamping element, such as a zener diode 142, is provided to limit the voltage across capacitor 126 to a safe value.

The operation of the circuit of FIG. 2 is next to be described.

When transistor 116 of the forward converter switches off, the magnetizing energy stored in the core of transformer 112 and the energy in leakage inductance 120 are discharged into capacitor 126 via diode 129. The energy transfer process takes place during the "off" time of transistor 116. At the same time, the polarity of winding 124 provides a positive voltage to the gate of switching transistor 130 via pulse shaping network 140. Pulse shaping network 140, it will be recalled, insures that the gate voltage of switching transistor 130 is at the correct value for any value signal that appears across drive winding 124 over the operating voltage range of converter 110, causing transistor 130 to conduct and connect inductor 128 across capacitor 126. The voltage on capacitor 126 causes a current to build up in inductor 128. As a result, an amount of energy proportional to the square of the current flowing in inductor 128 is extracted from capacitor 126.

When transistor 116 turns on again, the polarity of the voltage across drive winding 124 reverses, and switching transistor 130 is turned off. The current flowing in inductor 128 is diverted from transistor 130 to diode 132. Diode 132 connects inductor 128 to voltage source 118. It will be noted that the voltage across inductor 128 is now reversed and as a result, the inductor discharges the energy stored in it back into voltage source 118.

It is to be appreciated that inductor 128 extracts an amount of energy from capacitor 126 approximately equal to the sum of the magnetizing and leakage energies from primary winding 114. Thus, a voltage is established across capacitor 126 that is inversely proportional to the input voltage of forward converter 110.

It is to be further appreciated that the voltage across capacitor 126 causes the demagnetization process of transformer 112 to be completed at the moment switching transistor 116 is turned on.

From the above, the following sequence of events occurs under a steady state operation:

The energy is extracted from the input source and stored in the magnetizing and leakage inductance of transformer 112 during the conduction time of transistor 116, and energy is returned to voltage source 118 by inductor 128.

The energy stored during the conduction time of transistor 116 is discharged into capacitor 126, and energy is extracted from capacitor 126 by inductor 128 during the "off" time of transistor 116.

A mathematical explanation of the operation of the circuit of FIG. 2 follows next.

The energy $E_{112}$ stored in the transformer 112 at the end of the conduction period $t_{on}$ of transistor 116 is the sum of the leakage and magnetizing energies of the transformer:

$$E_{112} = \tfrac{1}{2}(L_m I_m^2 + L_e I_e^2) \tag{1}$$

where $L_m$ is the magnetizing inductance of transformer 112, $I_m$ is the magnetizing current at the turn off instant, $L_e$ is the leakage inductance (represented by inductor 120 in FIG. 2), and $I_e$ is the load current reflected to primary winding 114.

The value of the magnetizing current Im is given by:

$$I_m = V_{118} t_{on}/L_m \tag{2}$$

where $V_{118}$ is the value of voltage source 118 and $t_{on}$ is the conduction time of transistor 116.

Under steady state conditions, the energy $E_{128}$ extracted from capacitor 126 by inductor 128 during the conduction time of transistor 130 (which corresponds to the off period of transistor 116) is given by:

$$E_{128} = \tfrac{1}{2} L_{128} I_{128}^2 = \frac{V_{126}^2 t_{off}^2}{L_{128}} \tag{3}$$

where $V_{126}$ is the voltage across capacitor 126, $L_{128}$ is the inductance of inductor 128, $I_{128}$ is the current in inductor 128 at the end of the conduction period of transistor 130, and $t_{off}$ is the off period of transistor 116, which, as described hereinbefore, equals the conduction time of transistor 130.

In order to assure demagnetization of transformer 112, the energies injected into and extracted from capacitor 126 must be equal. Substituting (2) into (1) and equating to (3) yields:

$$\frac{V_{118}^2 t_{on}^2}{L_m} + L_e I_e^2 = \frac{V_{126}^2 t_{off}^2}{L_{128}} \tag{4}$$

The demagnetization of transformer 112 also requires that the volt second product impressed on primary winding 114 over a full switching period $t_{on} + t_{off}$ be zero:

$$V_{118} t_{on} = V_{126} t_{off} \tag{5}$$

Also, in order to regulate the output voltage, the control circuit of forward converter 110 varies the conduction time of transistor 116 so that the identity:

$$V_{118} t_{on} = \text{constant} = K_v \tag{6}$$

is established for any value of $V_{118}$ within the operating range of the converter.

Substituting (5) and (6) into (4) yields:

$$\frac{K_v^2}{L_m} + L_e I_e^2 = \frac{K_v^2}{L_{128}} \tag{7}$$

Solving (7) for $L_{128}$ yields the value that will satisfy all above conditions:

$$L_{128} = \frac{1}{\frac{1}{L_m} + \frac{L_e I_e^2}{K_v^2}} \tag{8}$$

Clamping element 142, represented by zener diode 142 in the preferred embodiment, is derived from Equation 8, which indicates that an increase in the value of $K_v$ will result in a higher value of $L_{128}$ as a solution for (8).

A momentary increase in the value of $K_v$ will occur when the load applied to the forward converter is suddenly increased and the control circuit momentarily increases the conduction time of transistor 116 until the current in the filter choke equals the new load current.

Since inductor $L_{124}$ is designed using Equation (8) for the steady state operation, its value will be too low under the load transient condition and energy extracted from capacitor 126 will be lower than the energy injected into it by transformer 112.

As a result, the voltage across capacitor 126 will tend to increase and might well reach values in excess of the rating of transistor 116.

Under the conditions described above, clamping element 142 will conduct, thereby limiting the voltage across capacitor 126 to a safe value.

It should be noted that, unlike the clamping devices used in prior art demagnetization circuits, which must absorb the leakage energy on a steady state basis, clamping element 142 is active only under load transients, and therefore, dissipates only a fraction of the power dissipated by the clamping circuits in a conventional forward converter.

A practical example of the advantages provided by an embodiment of the present invention, as compared with prior art forward converters, follows next.

For comparison purposes, a typical prior art forward converter has the following parameters:
Input voltage range: $Vin_{min} = 100$ V; $Vin_{max} = 200$ V
Transformer turns ratio (secondary to primary): 1.0
Switching transistor voltage rating: 400 V DC
Solving equation (C) and (B) for the maximum duty cycle $\delta_{max}$ yields:

$$\delta_{max} = 0.5$$

The maximum duty cycle occurs at the minimum input voltage. The minimum duty cycle, occurring at the maximum input voltage, will be:

$$\delta_{min} = \delta_{max} \cdot \frac{Vin_{min}}{Vin_{max}} = 0.5 \cdot \frac{100}{200} = 0.25$$

Assuming that the circuit of the present invention operates over the same duty cycle and input voltage ranges, the voltage across switching transistor 116 is given by $$V_{116} = V_{in} + V_{126}$$

$$V_{126} t_{off} = V_{126in} \cdot t_{on}$$

$$V_{126} = \frac{V_{in} t_{on}}{t_{off}} = V_{in} \frac{\delta}{1-\delta}$$

resulting in 200 V at low line and 266.7 V at high line. As a result, the 400 V transistor required by the forward converter using prior art demagnetization circuits can be replaced by a transistor rated at only 266.7 V. In addition, since only 200 V appear across the transistor at low line, the maximum duty cycle can be increased to the point where the low line and the high line stresses are equal:

$$V_{116} = 266.7 = V_{in}\left(1 + \frac{\delta}{1-\delta}\right)$$

$$V_{in}\delta = 100 \times 0.5$$

Solution of the above equation yields $\delta = 0.75$ and $V_{in} = 66.67$ V, which indicates that the demagnetization circuit of the present invention also significantly increases the operating input voltage range to 66 V to 200 V, from the 100 to 200 V range found in the corresponding prior art circuit.

From the above, it will be evident to those skilled in the art that an increase in the maximum allowable duty cycle occurs in return for a decrease in the turns radio of the transformer of the converter. Accordingly, the current rating of the switching transistor is reduced.

The design of transformer 112 and selection of capacitor 126 follows next.

Equation (8) indicates that, when load current $I_e$ is reduced, the value of inductor 128 required for proper operation of the converter increases. Since the value of inductor 128 is calculated from Equation (8) for full load current, under light load conditions inductor 128 will extract more energy from capacitor 126 than transformer 112 injects into capacitor 126. As a result, the voltage across capacitor 126 will decrease and transformer 112 will not fully demagnetize. Therefore, the magnetizing current of transformer 112 will begin to increase. The increase in the magnetizing current will stop when the peak value of the magnetizing current $I_m$ reaches a value that will increase the magnetizing energy by the same amount that the leakage energy has decreased. Transformer 112 must allow for the maximum magnetizing current that may be expected in the transformer at light loads, in order to avoid possible transformer saturation.

The operation of the circuit described in the present invention requires the voltage across capacitor 126 to be constant. In order for a practical circuit to approximate the ideal model described heretofore, the voltage across capacitor 126 must not increase or decrease by more than a few percent as energy is injected or extracted from it during the circuit operation.

The requirement described above results in a constraint on the minimum value of capacitor 126, which can be calculated by those skilled in the art. The maximum allowable value of capacitor 126 is determined by the maximum allowable value of the magnetizing current of transformer 112, which must charge capacitor 126 from zero voltage to the steady state operating value at the converter start-up. Any value of capacitor 126 falling between the predetermined limits insures proper operation of the circuit.

It is to be appreciated from the above description that, when an embodiment of the present invention is used with a forward converter, the voltage across the switching transistor of the converter is significantly reduced from the voltage across the switching transistor in a prior art forward converter because the demagnetization voltage developed across the transformer of the forward converter does not have to be a large value for complete demagnetization to occur.

It is to be further appreciated that a large range of input voltages can be applied to a forward converter embodying the present invention, as compared with a prior art forward converter since the maximum duty cycle δ max can be increased without the penalty of increased voltage across the switching transistor because the demagnetization voltage is inversely proportional to the input voltage.

It is to be still further appreciated that the turns ratio of the transformer in the forward converter used with an embodiment of the present invention is much lower than in a prior art converter because a large increase of the maximum allowable duty cycle is possible.

As an added advantage of the present invention, the filter choke value in a forward converter including an embodiment of the circuit of the present invention can be significantly reduced from the filter choke value of a prior art forward converter because the increase in the duty cycle allows a reduction in the peak to peak ripple current in the filter choke for a given choke inductance.

Although an illustrative embodiment of the present invention has been described in detail herein with reference to the accompanying drawings, it is to be understood that the invention is not limited to that precise embodiment, and that various changes and modifications may be effected therein by one skilled in the art without departing from the spirit and scope of the invention as defined in the appended claims.

What is claimed is:

1. A demagnetization circuit for use with a forward converter having a transformer with a primary winding, and an input voltage source, said circuit comprising:
    capacitance means for absorbing magnetizing and leakage energies from said primary winding of said forward converter, wherein said forward converter has a switching transistor with an off condition and an on condition;
    inductance means for absorbing energy stored in said capacitance means;
    switching means responsive to a switching signal for selectively connecting said inductance means to said input voltage source of said forward converter; and
    means for supplying said switching signal to said switching means to connect said inductance means to said input voltage source when said switching transistor is in said on condition.

2. The circuit of claim 1; wherein said forward converter has a switching transistor with an off condition and an on condition; and wherein the voltage of said capacitance means is preset whereby said demagnetization of said primary winding is completed when said switching transistor of said forward converter is placed in said off condition.

3. The circuit of claim 1; and further comprising voltage clamping means for limiting voltage supplied to said capacitance means to below a preset amount.

4. The circuit of claim 3; and further comprising drive winding means magnetically coupled to said primary winding of said forward converter and electrically coupled to said capacitance means.

5. The circuit of claim 4; and further comprising unidirectional conducting means for permitting current to flow only from said primary winding of said forward converter to said capacitance means.

6. The circuit of claim 5; and further comprising a second unidirectional conducting means in addition to the first-mentioned unidirectional conducting means for permitting current to flow only from said inductance means to said input voltage source of said forward converter.

7. The circuit of claim 6; and further comprising pulse shaping means connected to said drive winding for supplying said switching signal to said switching means.

8. The circuit of claim 1; wherein said inductance means receives energy from said capacitance means approximately equal to said magnetizing and leakage energies whereby a voltage inversely proportional to the input voltage of said input voltage source is supplied to said capacitance means.

9. The circuit of claim 1; wherein said capacitance means includes a capacitor.

10. The circuit of claim 9; wherein said inductance means includes a choke.

11. A demagnetization circuit for use with a forward converter having a transformer with a primary winding, and an input voltage source, said circuit comprising:
    capacitance means for absorbing magnetizing and leakage energies from said primary winding of said forward converter;
    a first unidirectional conducting device connected between said primary winding and said capacitance means;
    inductance means for absorbing energy supplied from said capacitance means;
    switching means responsive to a switching signal for selectively connecting said inductance means to said capacitance means; and
    a second unidirectional conducting means connected between said input voltage source and said inductance means.

12. The circuit of claim 11; wherein said inductance means extracts an amount of energy from said capacitance means equal to the sum of said magnetizing and leakage energies from said primary winding, whereby a voltage is established across said capacitance means that is is inversely proportional to the input voltage of said forward converter.

13. The circuit of claim 11; wherein said forward converter includes a switching transistor; and wherein the voltage across said capacitance means has substantially completely demagnetized said transformer of said forward converter at the moment when said switching transistor turns on.

14. The circuit of claim 11; and further comprising means for supplying said switching signal to said switching means.

15. The circuit of claim 14; wherein said forward converter includes a switching transistor; and wherein said means for supplying includes drive winding means, magnetically coupled to said primary winding, for supplying said switching signal to said switching means when said switching transistor of said forward converter is off.

16. The circuit of claim 15; wherein said switching means includes an n-channel field effect transistor.

17. The circuit of claim 16; wherein said first unidirectional conducting device includes a first diode.

18. The circuit of claim 17; wherein said input voltage source has a plus terminal and a minus terminal, and said first diode has a cathode and an anode; and wherein said capacitance means is connected between said plus terminal of said input voltage source and said cathode of said first diode.

19. The circuit of claim 18; wherein said first diode is connected between said primary winding of said transformer and said capacitance means.

20. The circuit of claim 19; wherein said second unidirectional conducting means includes a second diode.

21. The circuit of claim 20; wherein said n-channel field effect transistor has a source terminal and a drain terminal; and wherein said inductance means is connected between said plus terminal of said input voltage source and said source of said n-channel field effect transistor.

22. The circuit of claim 21; wherein said second diode has a cathode and an anode; and wherein said cathode of said second diode is connected to said source terminal of said n-channel field effect transistor, and said anode of said second diode is connected to said minus terminal of said input voltage source.

23. The circuit of claim 22; wherein said drain terminal of said n-channel field effect transistor is connected to said cathode of said first diode.

* * * * *

UNITED STATES PATENT AND TRADEMARK OFFICE
CERTIFICATE OF CORRECTION

PATENT NO.   : 4,736,285
DATED        : April 5, 1988
INVENTOR(S)  : Itzchak Cohen It is certified that error appears in the above-identified patent and that said Letters Patent is hereby corrected as shown below:

On the Title Page and Figure 2 of the Drawing, the Zener diode 142 should be reversed to switch its two connections.

Signed and Sealed this

Fourth Day of October, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,736,285
DATED : April 5, 1988
INVENTOR(S) : Itzchak Cohen

It is certified that error appears in the above-identified patent and that said Letters Patent is hereby corrected as shown below:

At column 1, line 36, delete "were" from "controlled to be were inversely".

At column 3, line 22 insert --.-- after "of transformer 18".

At column 3, line 45, substitute $$-- t_{off} = t_{on} \frac{N_{16}}{N_{28}} --$$

for $$"t_{off} = t_{on} \frac{N_{16}}{N_{16}}."$$

At column 4, line 38 insert --)-- after "output circuit 143 are shown."

Signed and Sealed this

Twenty-ninth Day of November, 1988

Attest:

DONALD J. QUIGG

*Attesting Officer*          *Commissioner of Patents and Trademarks*